(12) United States Patent
Saito et al.

(10) Patent No.: US 8,967,123 B2
(45) Date of Patent: Mar. 3, 2015

(54) SHUT-OFF VALVE FAULT DIAGNOSIS DEVICE AND FUEL SUPPLY SYSTEM

(75) Inventors: Yoshio Saito, Shioya-gun (JP); Takayuki Shimatsu, Shioya-gun (JP)

(73) Assignee: Keihin Corporation (JP)

( * ) Notice: Subject to any disclaimer, the term of this patent is extended or adjusted under 35 U.S.C. 154(b) by 339 days.

(21) Appl. No.: 13/635,220

(22) PCT Filed: Jan. 6, 2011

(86) PCT No.: PCT/JP2011/050114
§ 371 (c)(1),
(2), (4) Date: Sep. 14, 2012

(87) PCT Pub. No.: WO2011/114757
PCT Pub. Date: Sep. 22, 2011

(65) Prior Publication Data
US 2013/0000752 A1   Jan. 3, 2013

(30) Foreign Application Priority Data

Mar. 19, 2010  (JP) ................................. 2010-064466

(51) Int. Cl.
*F02D 19/00*   (2006.01)
*F02D 19/06*   (2006.01)
(Continued)

(52) U.S. Cl.
CPC ........ *F02D 19/0613* (2013.01); *F02D 19/0681* (2013.01); *F02D 19/022* (2013.01);
(Continued)

(58) Field of Classification Search
CPC ............ F02D 41/0027; F02D 19/0681; F02D 19/025; F02D 19/026; F02D 19/0647; F02M 21/0242

USPC ............ 123/510, 27 GE, 525, 575, 299, 300, 123/304, 577, 578, 198 D, 529; 701/101, 701/102, 114
See application file for complete search history.

(56) References Cited

U.S. PATENT DOCUMENTS 5,632,250 A * 5/1997 Kato et al. ..................... 123/490
5,755,210 A * 5/1998 Sato et al. ..................... 123/518
(Continued)

FOREIGN PATENT DOCUMENTS

DE   102005048456 A1   4/2007
EP      1950409 A2      7/2008
(Continued)

OTHER PUBLICATIONS

International Search Report for International Application No. PCT/JP2011/050114, mailed Apr. 12, 2011, with English translation.
(Continued)

*Primary Examiner* — Mahmoud Gimie
(74) *Attorney, Agent, or Firm* — Cantor Colburn LLP

(57) ABSTRACT

Provided is a shut-off valve fault diagnosis device that performs fault diagnosis of a first shut-off valve that is disposed immediately after a gaseous fuel tank and a second shut-off valve that is disposed immediately before a regulator in a gaseous fuel supply system. The shut-off valve fault diagnosis device includes a diagnosis processing unit that performs a valve-shutting control of the first shut-off valve, performs a valve-shutting control of the second shut-off valve after a predetermined time has passed since the valve-shutting control of the first shut-off valve, and performs fault diagnosis of the first shut-off valve and the second shut-off valve based on a variation tendency in a fuel pressure between the first shut-off valve and the second shut-off valve after performing the valve-shutting control of the second shut-off valve.

10 Claims, 5 Drawing Sheets

(51) Int. Cl.
*F02D 19/02* (2006.01)
*F02M 21/02* (2006.01)

(52) U.S. Cl.
CPC ............ *F02D19/025* (2013.01); *F02D 19/027* (2013.01); *F02D 19/0647* (2013.01); *F02M 21/0242* (2013.01); *Y02T 10/36* (2013.01); *Y02T 10/32* (2013.01); *F02D 19/0692* (2013.01)
USPC .......................................... 123/529; 123/525

(56) References Cited

U.S. PATENT DOCUMENTS

| | | | |
|---|---|---|---|
| 6,390,075 B1 * | 5/2002 | Yamazaki et al. | ............ 123/529 |
| 6,401,698 B1 | 6/2002 | Yamazaki et al. | |
| 6,427,670 B2 * | 8/2002 | Goto et al. | .................... 123/529 |
| 6,467,466 B1 | 10/2002 | Maekawa et al. | |

FOREIGN PATENT DOCUMENTS

| | | |
|---|---|---|
| JP | 2001-207868 A | 8/2001 |
| JP | 2003-308868 A | 10/2003 |
| JP | 2006-134861 A | 5/2006 |
| JP | 2006-210055 A | 8/2006 |
| JP | 3859925 B2 | 9/2006 |

OTHER PUBLICATIONS

Extended European Search Report for Application No. 11755947.6-1606/2549092; PCT/JP2011050114, Date of Mailing Dec. 18, 2013. 6 pages.

* cited by examiner

SHUT-OFF VALVE FAULT DIAGNOSIS DEVICE AND FUEL SUPPLY SYSTEM

CROSS REFERENCE TO RELATED APPLICATIONS

This is a U.S. national stage of application No. PCT/JP2011/050114, filed on 6 Jan. 2011. Priority under 35 U.S.C. §119(a) and 35 U.S.C. §365(b) is claimed from Japanese Application No. 2010-064466, filed 19 Mar. 2010, the disclosure of which are also incorporated herein by reference.

TECHNICAL FIELD

The present invention relates to a shut-off valve fault diagnosis device and a fuel supply system.

Priority is claimed on Japanese Patent Application No. 2010-064466, filed Mar. 19, 2010, the content of which is incorporated herein by reference.

BACKGROUND ART

In recent years, as a technology for improving fuel efficiency and the environmental protection performance of a vehicle, introduction of a bi-fuel engine system, which selectively switches between a liquid fuel, such as gasoline, and a gaseous fuel, such as compressed natural gas (CNG), and supplies the fuels to a single engine, has progressed. Generally, in this bi-fuel engine system, in a case of using the gaseous fuel, the highly pressurized gaseous fuel that is filled in a gas tank is decompressed to a predetermined pressure by a regulator and is supplied to a fuel injection valve that is dedicated to the gaseous fuel.

An electromagnetic type shut-off valve is inserted in a fuel supply path ranging from the gas tank to the regulator, and initiation and stop of the gaseous fuel supply may be switched by controlling the open and shut states of the shut-off valve using a control device. A shut-off valve fault may have a significant adverse effect on the entirety of a system, such that various technologies for diagnosing shut-off valve faults have been developed in the related art. For example, PTL 1 discloses a technology in which a valve-shutting control of a shut-off valve is performed during operation of an engine, and in a case where the amount of a drop in a gaseous fuel pressure after the control exceeds a reference value within a predetermined diagnosis time, it is determined that the shut-off valve is in a shut valve state (normal). On the other hand, in a case where the amount of the drop does not exceed the reference value, it is determined that the shut-off valve is fixed-opened (abnormal).

CITATION LIST

Patent Literature

[PTL 1] Japanese Patent No. 3859925

SUMMARY OF INVENTION

Technical Problem

It is sufficient for one shut-off valve to be provided immediately after a gas tank so as to prevent severe fuel leakage from occurring. However, in a case where fuel leakage occurs downstream (low-pressure side) of a regulator, since high-pressure gaseous fuel that is present in a fuel supply path ranging from the shut-off valve to the regulator is leaked to the outside through the regulator, even when the shut-off valve is shut, a large amount of fuel may be leaked. In recent years, there have been cases in which another shut-off valve has been disposed at a switching point between a high-pressure side and a low-pressure side, that is, immediately before the regulator so as to prevent the leakage from occurring.

In a system provided with a plurality of shut-off valves as described above, application of the technology disclosed in PTL 1 so as to determine which shut-off valve is in a fault state may lead to complications in the system. This is because the technology disclosed in PTL 1 is a technology assuming that there is only one shut-off valve, which is the object to be diagnosed, such that it is necessary to provide a pressure sensor for each of the plurality of shut-off valves when applying this technology to fault diagnosis of the plurality of shut-off valves (increased complication of the hardware). Furthermore, in addition to this, it is necessary to perform the shutting control and fault determination process with respect to each of the shut-off valves (increased complication of the software).

The present invention has been made in consideration of the above-described circumstances, and an object thereof is to provide a shut-off valve fault diagnosis device and a fuel supply system, which are capable of realizing fault diagnosis of a first shut-off valve that is disposed immediately after a gaseous fuel tank and a second shut-off valve that is disposed immediately before a regulator in a gaseous fuel supply system with a simple configuration in terms of software and hardware.

Solution to Problem

To solve the above-described problem, according to an embodiment of the present invention, there is provided a shut-off valve fault diagnosis device that performs fault diagnosis of a first shut-off valve that is disposed immediately after a gaseous fuel tank and a second shut-off valve that is disposed immediately before a regulator in a gaseous fuel supply system. The shut-off valve fault diagnosis device includes a diagnosis processing unit that performs a valve-shutting control of the first shut-off valve, performs a valve-shutting control of the second shut-off valve after a predetermined time has passed since the valve-shutting control of the first shut-off valve, and performs fault diagnosis of the first and second shut-off valves based on a variation tendency in a fuel pressure between the first shut-off valve and the second shut-off valve after performing the valve-shutting control of the second shut-off valve.

In addition, in the present invention, in a case where the variation tendency in the fuel pressure after performing the valve-shutting control of the second shut-off valve is in an upward tendency, the diagnosis processing unit may determine that the first shut-off valve is in a fault state.

In addition, in the present invention, in a case where the variation tendency in the fuel pressure after performing the valve-shutting control of the second shut-off valve is in a downward tendency, the diagnosis processing unit may determine that the second shut-off valve is in a fault state.

In addition, in the present invention, the diagnosis processing unit may perform fault diagnosis of the first and second shut-off valves when an engine operation is stopped.

In addition, in the present invention, the diagnosis processing unit may perform the fault diagnosis of the first and second shut-off valves when gaseous fuel supply by the gaseous fuel supply system is switched to liquid fuel supply by a liquid fuel supply system.

To solve the above-described problem, according to another embodiment of the present invention, there is provided a fuel supply system that is provided with a first shut-off valve that is disposed immediately after a gaseous fuel tank and a second shut-off valve that is disposed immediately before a regulator in a gaseous fuel supply system. The fuel supply system includes a pressure sensor that detects a fuel pressure between the first shut-off valve and the second shut-off valve; and a shut-off valve fault diagnosis device that performs a valve-shutting control of the first shut-off valve, performs a valve-shutting control of the second shut-off valve after a predetermined time has passed since the valve-shutting control of the first shut-off valve, and performs fault diagnosis of the first and second shut-off valves based on a variation tendency in the fuel pressure after performing the valve-shutting control of the second shut-off valve.

As described above, when the valve-shutting control of the second shut-off valve is performed after a predetermined time has passed since the valve-shutting control of the first shut-off valve, the variation tendency in the fuel pressure between the first shut-off valve and the second shut-off valve after performing the valve-shutting control of the second shut-off valve varies in correspondence with a fault state of the first and second shut-off valves. Specifically, the fault diagnosis of the first shut-off valve and the second shut-off valve may be performed by confirming the variation tendency in the fuel pressure after performing the valve-shutting control of the second shut-off valve. At this time, since it is sufficient for there to be one pressure sensor, and the fault diagnosis of the first shut-off valve and the second shut-off valve may be performed simultaneously, the fault diagnosis of both of the shut-off valves may be realized with a simple configuration in terms of hardware and software.

In addition, in the present invention, in a case where the variation tendency in the fuel pressure after performing the valve-shutting control of the second shut-off valve is in an upward tendency, the shut-off valve fault diagnosis device may determine that the first shut-off valve is in a fault state.

In a case where a fuel leakage abnormality occurs in the first shut-off valve, since the gaseous fuel downstream of the second shut-off valve is consumed by a fuel injection valve after performing the valve-shutting control of the first shut-off valve, fuel pressure decreases once, but since the gaseous fuel does not flow to the downstream of the second shut-off valve after performing the valve-shutting control of the second shut-off valve, fuel pressure increases. That is, in a case where the variation tendency in the fuel pressure after performing the valve-shutting control of the second shut-off valve is in an upward tendency, it may be determined that the first shut-off valve is in a fault state.

In addition, in the present invention, in a case where the variation tendency in the fuel pressure after performing the valve-shutting control of the second shut-off valve is in a downward tendency, the shut-off valve fault diagnosis device may determine that the second shut-off valve is in a fault state.

In a case where a fuel leakage abnormality occurs in the second shut-off valve, since the gaseous fuel downstream of the second shut-off valve is consumed by a fuel injection valve after performing the valve-shutting control of the first shut-off valve, fuel pressure decreases once, and since the gaseous fuel flows to the downstream of the second shut-off valve due to the fuel leakage after performing the valve-shutting control of the second shut-off valve and is consumed by the fuel injection valve, the fuel pressure decreases. That is, in a case where the variation tendency in the fuel pressure after performing the valve-shutting control of the second shut-off valve is in a downward tendency, it may be determined that the second shut-off valve is in a fault state.

In addition, in the present invention, the shut-off valve fault diagnosis device may perform the fault diagnosis of the first and second shut-off valves when engine operation is stopped.

The shut-off valve opening and shutting operation during an engine operation may lead to a variation in fuel pressure, and thus there is a concern in that driveability and emission may be deteriorated due to deviation in a fuel injection amount. However, as described above, when the fault diagnosis of the first and second shut-off valves is performed when the engine operation is stopped, it is possible to avoid such a problem.

In addition, in a case of using a shut-off valve of a kick pilot structure, which is provided with a pilot valve that is opened in advance during power supply and a main valve that is opened due to a decrease in differential pressure between upstream and downstream after the pilot valve is opened, when the differential pressure between the upstream and downstream of the shut-off valve occurs during the fault diagnosis, there is a concern in that the main valve may not be opened when the fuel consumption amount by the fuel injection valve exceeds a fuel supply amount from the pilot valve. However, when the fault diagnosis of the first and second shut-off valves is performed while the engine operation is stopped, there is no problem in the engine operation even when main valve is not opened.

In addition, in the present invention, the fuel supply system may further include a liquid fuel supply system in addition to the gaseous fuel supply system, and the shut-off valve fault diagnosis device may perform the fault diagnosis of the first and second shut-off valves when gaseous fuel supply by the gaseous fuel supply system is switched to liquid fuel supply by the liquid fuel supply system.

In this manner, when the fault diagnosis of the first and second shut-off valves is performed while gaseous fuel supply by the gaseous fuel supply system is switched to liquid fuel supply by the liquid fuel supply system, the same effect as the case in which the fault diagnosis is performed when the engine is stopped may be obtained. Furthermore, since the fuel injection valve is in an operation state and the gaseous fuel is supplied to the engine during the fault diagnosis, when the fault diagnosis is performed while the engine is stopped, the gaseous fuel is useless. However, when the fault diagnosis is performed when the gaseous fuel supply is switched to the liquid fuel supply, this uselessness may be avoided.

Advantageous Effects of Invention

According to the present invention, a shut-off valve fault diagnosis device and a fuel supply system, which are capable of realizing fault diagnosis of a first shut-off valve that is disposed immediately after a gaseous fuel tank and a second shut-off valve that is disposed immediately before a regulator in a gaseous fuel supply system with a simple configuration in terms of software and hardware, may be provided.

DESCRIPTION OF EMBODIMENTS

Hereinafter, an embodiment of the present invention will be described with reference to the attached drawings. In addition, in the following description, as a fuel supply system relating to the present invention, a bi-fuel engine system that selectively switches between a liquid fuel such as gasoline and a gaseous fuel such as compressed natural gas (CNG) and supplies it to a single engine will be described as an example. In addition, as a shut-off valve fault diagnosis device relating to the present invention, an ECU (Electronic Control Unit), which is used in the bi-fuel engine system, will be described as an example.

Figure 1:
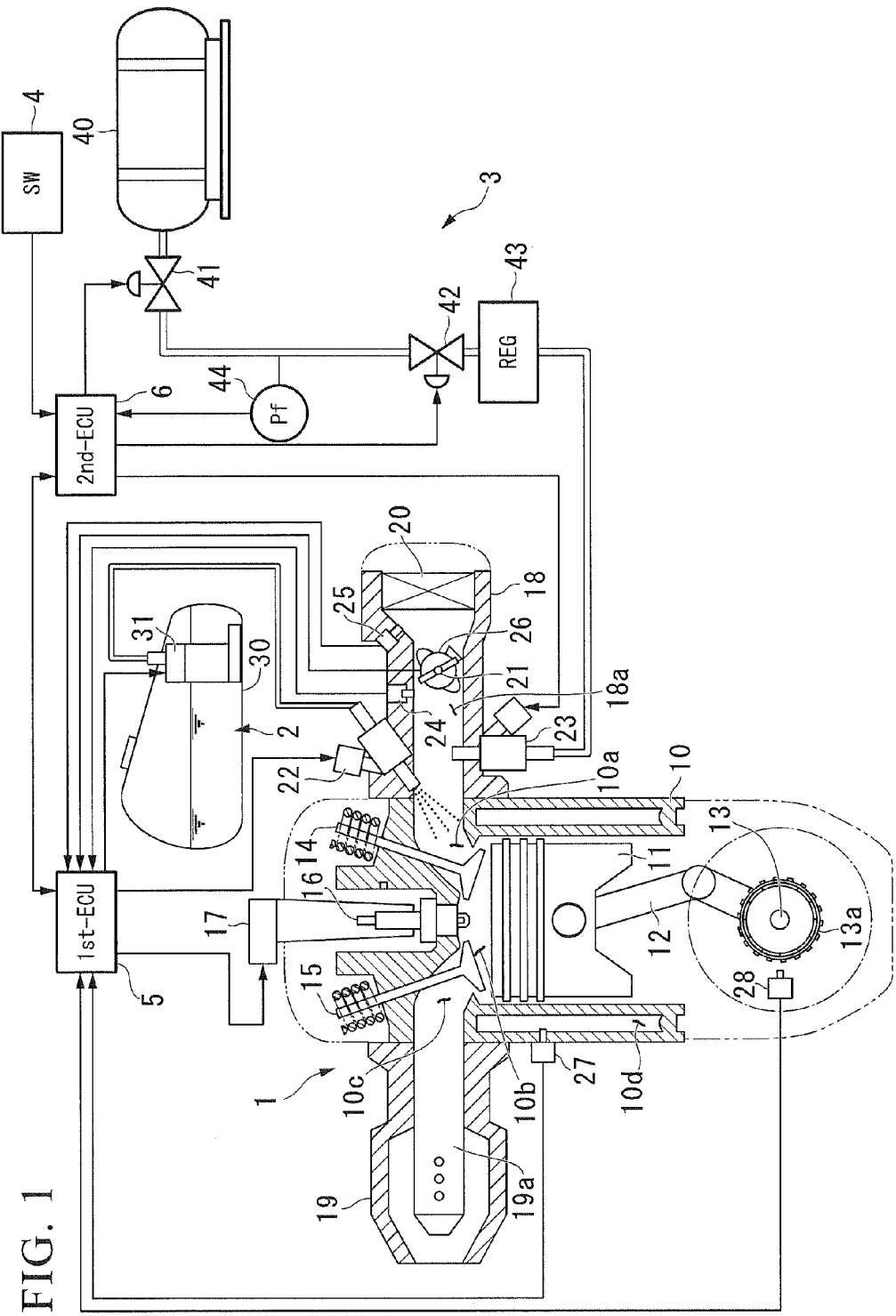
FIG. 1 is a schematic configuration diagram of a bi-fuel engine system A (fuel supply system) according to an embodiment.

FIG. 1 shows a schematic configuration diagram of a bi-fuel engine system A according to the embodiment.

As shown in FIG. 1, the bi-fuel engine system A in this embodiment schematically includes an engine 1, a liquid fuel supply system 2, a gaseous fuel supply system 3, a fuel-switching switch 4, a $1^{st}$-ECU 5, and a $2^{nd}$-ECU 6 (shut-off valve fault diagnosis device).

The engine 1 is a four-cycle engine that may selectively use a liquid fuel and a gaseous fuel, and includes a cylinder 10, a piston 11, a connecting rod 12, a crankshaft 13, an intake valve 14, an exhaust valve 15, an ignition plug 16, an ignition coil 17, an intake pipe 18, an exhaust pipe 19, an air cleaner 20, a throttle valve 21, a liquid fuel injection valve 22, a gaseous fuel injection valve 23, an intake air pressure sensor 24, an intake air temperature sensor 25, a throttle opening degree sensor 26, a cooling water temperature sensor 27, and a crank angle sensor 28.

The cylinder 10 is a hollow cylindrical member that is used to make the piston 11, which is provided at the inside of the cylinder 10, undergo a reciprocating motion by repeating four strokes including intake, compression, combustion (i.e., expansion), and exhaust. The cylinder 10 includes an intake port 10a, a combustion chamber 10b, and an exhaust port 10c. The intake port 10a is a flow path that is used to supply mixed gas of air and fuel to the combustion chamber 10b. The combustion chamber 10b is a space that is used to store the above-described mixed gas and to cause the mixed gas that has been compressed in the compression stroke to be combusted in the combustion stroke. The exhaust port 10c is a flow path that is used to discharge exhaust gas from the combustion chamber 10b to the outside in the exhaust stroke. A water cooling path 10d that is used to circulate cooling water is provided in an outer wall of the cylinder 10.

The crankshaft 13, which is used to convert the reciprocating motion of the piston 11 into rotational motion, is connected to the piston 11 via the connecting rod 12.

The crankshaft 13 extends in a direction orthogonal to the reciprocation direction of the piston 11, and is connected to a flywheel (not shown), a mission gear, and the like. A rotor 13a, which is used to detect a crank angle, is co-axially connected to the crankshaft 13. A plurality of protrusions are provided at an outer circumference of the rotor 13a in such a manner that the rear end of each of the protrusions is spaced with an equal angular interval (for example, at an interval of 20°) with respect to a rotational direction.

The intake valve 14 is a valve member that is used to open and shut an aperture portion of the air intake port 10a on the combustion chamber 10b side, and is connected to a camshaft (not shown). The intake valve 14 is driven to open and shut in response to the strokes by this camshaft.

The exhaust valve 15 is a valve member that is used to open and shut an aperture portion of the air exhaust port 10c on the combustion chamber 10b side, and is connected to a camshaft (not shown). The exhaust valve 15 is driven to open and shut in response to the strokes by this camshaft.

The ignition plug 16 is provided at an upper portion of the combustion chamber 10b in such a manner that electrodes are exposed to the inside of the combustion chamber 10b, and generates a spark between the electrodes by a high-voltage signal that is supplied from the ignition coil 17.

The ignition coil 17 is a transformer that is formed by a primary coil and a secondary coil. The ignition coil 17 boosts an ignition voltage signal that is supplied from the $1^{st}$-ECU 5 to the primary coil, and supplies the ignition voltage signal from the secondary coil to the ignition plug 16.

The intake pipe 18 is an air supply pipe and is connected to the cylinder 10 in such a manner that an intake flow path 18a provided inside the intake pipe 18 communicates with the intake port 10a.

The exhaust pipe 19 is a pipe that discharges exhaust gas and is connected to the cylinder 10 in such a manner that an exhaust flow path 19a inside the exhaust pipe communicates with the exhaust port 10c.

The air cleaner 20 is provided upstream of the intake pipe 18, purifies air taken in from the outside, and supplies the purified air to the intake flow path 18a.

The throttle valve 21 is provided inside the intake flow path 18a and rotates in response to throttle manipulation (or accelerator manipulation). That is, a cross-sectional area of the intake flow path 18a varies by the rotational motion of the throttle valve 21, and the air intake quantity accordingly varies.

The liquid fuel injection valve 22 is an electromagnetic valve (for example, a solenoid valve or the like) that is provided in the intake pipe 18 in such a manner that an injection port is exposed to the intake port 10a. The liquid fuel injection valve 22 injects the liquid fuel (gasoline or the like), which is supplied from the liquid fuel supply system 2, from the injection port in response to a fuel injection valve driving signal supplied from the $1^{st}$-ECU 5.

The gaseous fuel injection valve 23 is an electromagnetic valve (for example, a solenoid valve or the like) that is provided in the intake pipe 18 in such a manner that an injection port is exposed to the intake port 10a. The gaseous fuel injection valve 23 injects the gaseous fuel (CNG or the like), which is supplied from the gaseous fuel supply system 3, from the injection port in response to a fuel injection valve driving signal supplied from the $2^{nd}$-ECU 6.

The intake air pressure sensor 24 is a semiconductor pressure sensor that uses, for example, a piezoresistive effect. The intake air pressure sensor 24 is provided in the intake pipe 18 in such a manner that a sensitive surface thereof is exposed to the intake flow path 18a downstream of the throttle valve 21, and outputs an intake air pressure signal corresponding to the intake air pressure inside the intake pipe 18 to the $1^{st}$-ECU 5.

The intake air temperature sensor 25 is provided in the intake pipe 18 in such a manner that a sensitive portion thereof is exposed to the intake flow path 18a upstream of the throttle valve 21, and outputs the intake air temperature signal corresponding to the intake air temperature inside the intake pipe 18 to the $1^{st}$-ECU 5.

The throttle opening degree sensor 26 outputs a throttle opening degree signal corresponding to the opening degree of the throttle valve 21 to the 1$^{st}$-ECU 5.

The cooling water temperature sensor 27 is provided in the cylinder 10 in such a manner that a sensitive portion of the cooling water temperature sensor 27 is exposed to the cooling water path 10d of the cylinder 10, and outputs a cooling water temperature signal corresponding to the temperature of the cooling water that flows through the cooling water path 10d to the 1$^{st}$-ECU 5.

For example, the crank angle sensor 28 is an electromagnetic type pickup sensor. The crank angle sensor 28 outputs a pair of pulse signals having polarities different from each other to the 1$^{st}$-ECU 5 whenever each of the protrusions provided at the outer circumference of the rotor 13a passes the vicinity of the sensor 28. More specifically, the crank angle sensor 28 outputs a pulse signal having a negative polarity amplitude when the front end of each of the protrusions goes past in the rotation direction, and outputs a pulse signal having a positive polarity amplitude when the rear end of each of the protrusions goes past in the rotation direction.

The liquid fuel supply system 2 includes a liquid fuel tank 30 and a fuel pump 31.

The liquid fuel tank 30 is a vessel in which liquid fuel such as gasoline fuel and alcohol fuel is stored.

The fuel pump 31 pumps the liquid fuel out of the liquid fuel tank 30 and pumps out the liquid fuel to a fuel inlet of the liquid fuel injection valve 22 in response to a pump driving signal supplied from the 1$^{st}$-ECU 5.

The gaseous fuel supply system 3 includes a gaseous fuel tank 40, a first shut-off valve 41, a second shut-off valve 42, a regulator 43, and a pressure sensor 44.

The gaseous fuel tank 40 is a pressure resistant vessel in which highly pressurized gaseous fuel such as CNG is filled.

The first shut-off valve 41 is a shut-off valve that is disposed immediately after the gaseous fuel tank 40 in a fuel supply path ranging from the gaseous fuel tank 40 to the regulator 43. The first shut-off valve 41 switches between initiation and stop of gaseous fuel supply from the gaseous fuel tank 40 by performing a valve-opening operation and a valve-shutting operation in response to a first shut-off valve driving signal that is supplied from the 2$^{nd}$-ECU 6.

The second shut-off valve 42 is a shut-off valve that is disposed immediately before the regulator 43 in the fuel supply path ranging from the gaseous fuel tank 40 to the regulator 43. The second shut-off valve 42 switches between initiation and stop of gaseous fuel supply to a position after the regulator 43 by performing a valve opening operation and a valve shutting operation in response to a second shut-off valve driving signal that is supplied from the 2$^{nd}$-ECU 6.

The regulator 43 is a pressure regulating valve that is disposed immediately after the second shut-off valve 42 at the downstream thereof. The regulator 43 decompresses the high-pressure gaseous fuel that is supplied from the gaseous fuel tank 40 at the time of opening the first shut-off valve 41 and the second shut-off valve 42 to a desired pressure, and then delivers the decompressed gaseous fuel to a fuel inlet of the gaseous fuel injection valve 23.

The fuel pressure sensor 44 is a pressure sensor that detects a fuel pressure between the first shut-off valve 41 and the second shut-off valve 42 and outputs a pressure detection signal representing the detection result to the 2$^{nd}$-ECU 6.

The fuel-switching switch 4 is a switch to realize fuel-switching by a manual operation. The fuel-switching switch 4 outputs a fuel designation signal representing a state of the switch, that is, whether either the liquid fuel or the gaseous fuel is designated as fuel that is used in the engine 1 to the 2$^{nd}$-ECU 6.

Figure 2:
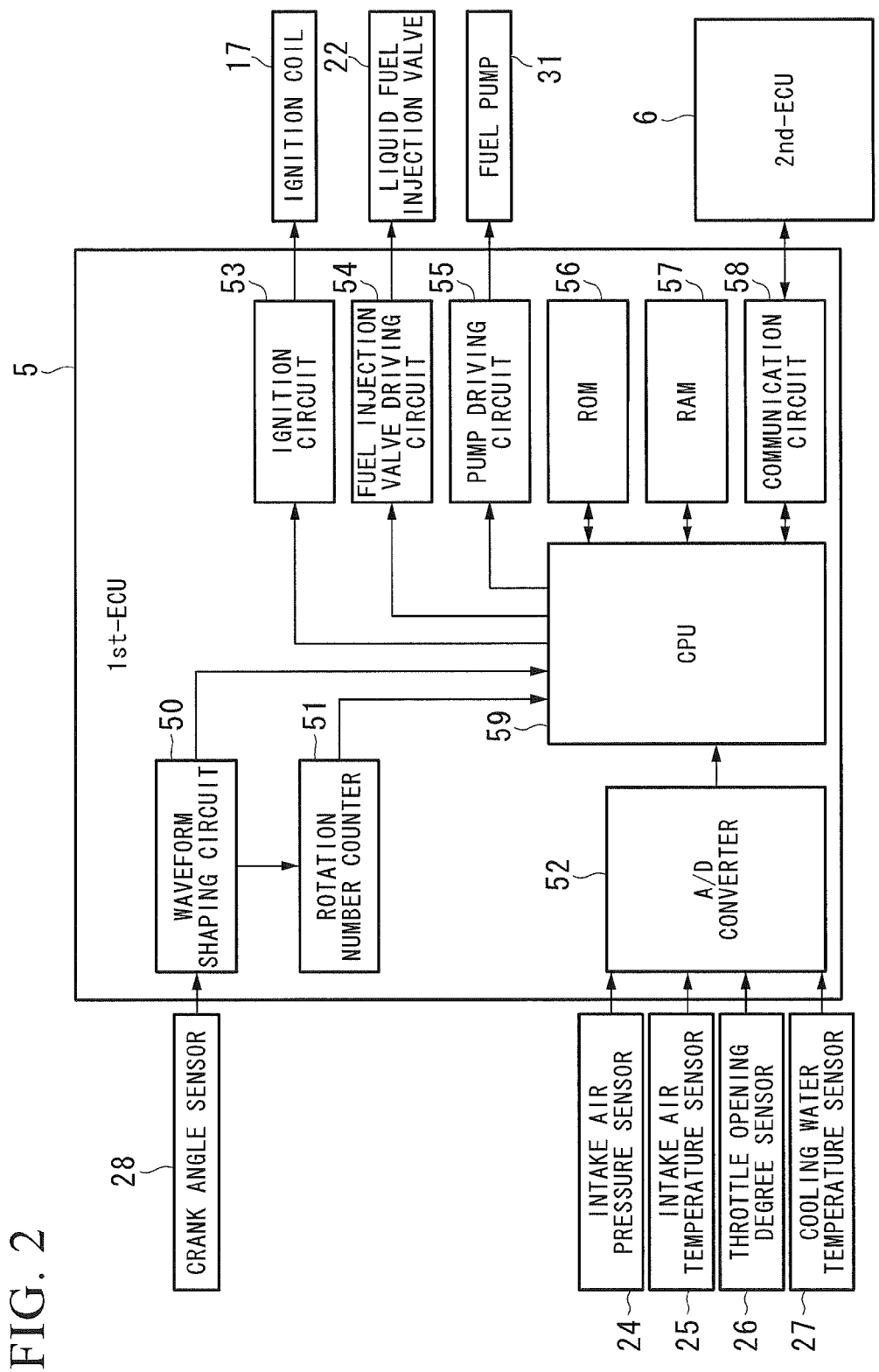
FIG. 2 is a block configuration diagram of $1^{st}$-ECU 5 according to this embodiment.

The 1$^{st}$-ECU 5 mainly performs operation control of the engine 1 that uses the liquid fuel. As shown in FIG. 2, the 1$^{st}$-ECU 5 includes a waveform shaping circuit 50, a rotation number counter 51, an A/D converter 52, an ignition circuit 53, a fuel injection valve driving circuit 54, a pump driving circuit 55, a ROM (Read Only Memory) 56, a RAM (Random Access Memory) 57, a communication circuit 58, and a CPU (Central Processing Unit) 59.

The waveform shaping circuit 50 perform is waveform shaping to change a crank signal that is input from the crank angle sensor 28 into a square-wave pulse signal (for example, to change a negative polarity crank signal into a high level signal, and change a positive polarity crank signal in a ground level into a low level signal), and outputs the waveform-shaped signal to the rotation number counter 51 and the CPU 59. That is, this square-wave pulse signal is a square-wave pulse signal whose cycle is the length of time that is taken for the crankshaft 13 to rotate 20°. In the following description, the square-wave pulse signal that is output from the waveform shaping circuit 50 is referred to as a crank pulse signal.

The rotation number counter 51 calculates the engine rotation number based on the crank pulse signal that is input from the above-described waveform shaping circuit 50, and outputs the calculation result to the CPU 59.

The A/D converter 52 converts an intake air pressure signal that is input from the intake air pressure sensor 24, an intake air temperature signal that is input from the intake air temperature sensor 25, a throttle opening degree signal that is input from the throttle opening degree sensor 26, and a cooling water temperature signal that is input from the cooling water temperature sensor 27 into a digital signal (a value of the intake air pressure, a value of the intake air temperature, a value of the throttle opening degree, and a value of the cooling water temperature), and then outputs this digital signal to the CPU 59.

The ignition circuit 53 includes a capacitor that accumulates power supply voltage that is supplied from a battery (not shown) and discharges electric charges that have been accumulated in the capacitor to a primary coil of the ignition coil 17 as an ignition voltage signal in accordance with the request from the CPU 59.

The fuel injection valve driving circuit 54 generates a fuel injection valve driving signal in accordance with the request from the CPU 59 and outputs this fuel injection valve driving signal to the liquid fuel injection valve 22.

The pump driving circuit 55 generates a pump driving signal in accordance with the request from the CPU 59, and outputs the pump driving signal to the fuel pump 31.

The ROM 56 is a non-volatile memory in which an engine control program to realize various functions of the CPU 59 and various types of setting data are stored in advance.

The RAM 57 is a volatile working memory that is used to temporarily hold data when the CPU 59 causes the engine control program to execute various operations.

The communication circuit 58 is a communication interface that realizes a data communication between the 1$^{st}$-ECU 5 and the 2$^{nd}$-ECU 6 under the control of the CPU 59, and is connected to the 2$^{nd}$-ECU 6 via a communication cable.

The CPU 59 performs operation control of the engine 1 by the liquid fuel in accordance with the engine control program that is stored in the ROM 56 based on the crank pulse signal that is input from the waveform shaping circuit 50, the engine rotation number that may be obtained from the rotation number counter 51, a value of the intake air pressure, a value of the intake air temperature, a value of the throttle opening degree, and a value of the cooling water temperature, which may be obtained from the A/D converter 52, and various kinds of information that may be obtained from the $2^{nd}$-ECU 6 via the communication circuit 58.

Specifically, the CPU 59 monitors a rotational state of the crankshaft 13 (in other words, a position of the piston 11 in the cylinder 10) based on the crank pulse signal that is input from the waveform shaping circuit 50, and outputs an ignition control signal to the ignition circuit 53 at the point in time at which the piston 11 reaches a position corresponding to an ignition time to cause the ignition plug 16 to spark.

When receiving an instruction of operation by using the liquid fuel from the $2^{nd}$-ECU 6 via the communication circuit 58, the CPU 59 outputs a fuel supply control signal to the pump driving circuit 55 so as to drive the fuel pump 31, and initiates supply of the liquid fuel to the liquid fuel injection valve 22. In addition, the CPU 59 outputs the fuel injection control signal to the fuel injection valve driving circuit 54 at the point in time at which the piston 11 reaches a position corresponding to a fuel injection time so as to perform injection of the liquid fuel by the liquid fuel injection valve 22. In addition, the CPU 59 also has a function of transmitting the position of the piston 11, the engine rotation number, the value of the intake air pressure, the value of the intake air temperature, the value of the throttle valve opening degree, and the value of the cooling water temperature, which the CPU 59 itself recognize, to the $2^{nd}$-ECU 6 via the communication circuit 58.

Figure 3:
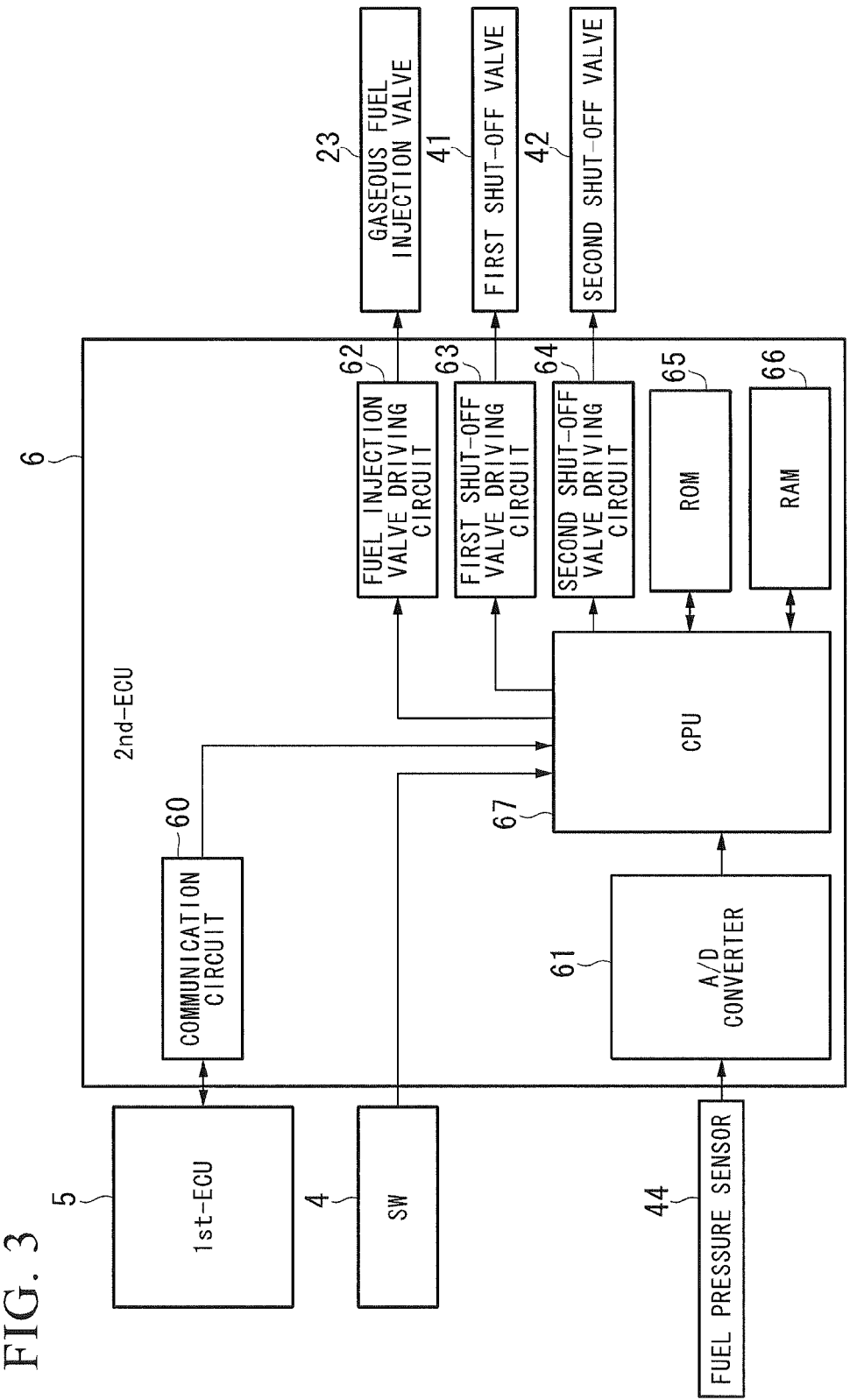
FIG. 3 is a block configuration diagram of a $2^{nd}$-ECU 6 (a shut-off valve fault diagnosis device) of this embodiment.

The $2^{nd}$-ECU 6 mainly performs operation control of the engine 1 that uses the gaseous fuel. As shown in FIG. 3, the $2^{nd}$-ECU 6 includes a communication circuit 60, an A/D converter 61, a fuel injection valve driving circuit 62, a first shut-off valve driving circuit 63, a second shut-off valve driving circuit 64, a ROM 65, a RAM 66, and a CPU 67.

The communication circuit 60 is a communication interface that realizes a data communication between the $1^{st}$-ECU 5 and the $2^{nd}$-ECU 6 under the control of the CPU 67, and is connected to the $1^{st}$-ECU 5 (more specifically, the communication circuit 58) via a communication cable.

The A/D converter 61 converts a pressure detection signal that is input from the fuel pressure sensor 44 into a digital signal and outputs this converted signal to the CPU 67. In addition, since the digital signal is a signal representing a fuel pressure between the first shut-off valve 41 and the second shut-off valve 42, hereinafter, the digital signal is referred to as a fuel pressure value.

The fuel injection valve driving circuit 62 generates a fuel injection valve driving signal in accordance with the request from the CPU 67 and outputs this fuel injection valve driving signal to the gaseous fuel injection valve 23.

The first shut-off valve driving circuit 63 generates a first shut-off valve driving signal in accordance with the request from the CPU 67 and outputs this first shut-off valve driving signal to the first shut-off valve 41.

The second shut-off valve driving circuit 64 generates a second shut-off valve driving signal in accordance with the request from the CPU 67 and outputs this second shut-off valve driving signal to the second shut-off valve 42.

The ROM 65 is a non-volatile memory in which an engine control program to realize various functions of the CPU 67 and various types of setting data are stored in advance.

The RAM 66 is a volatile working memory that is used to temporarily hold data when the CPU 67 causes the engine control program to execute various operations.

The CPU 67 (diagnosis processing unit) performs operation control of the engine 1 by the gaseous fuel in accordance with the engine control program that is stored in the ROM 65 based on the a fuel designation signal that is input from the fuel-switching switch 4, the position of the piston 11, the engine rotation number, the value of the intake air pressure, the value of the intake air temperature, the value of the throttle opening degree, and the value of the cooling water, which may be obtained from the $1^{st}$-ECU 5 via the communication circuit 60, and the fuel pressure value that may be obtained from the A/D converter 61.

Specifically, in a case where it is determined that the liquid fuel is designated as the fuel that is used in the engine 1 from an analysis result of the fuel designation signal that is input from the fuel-switching switch 4, the CPU 67 transmits an instruction of operation by using the liquid fuel to the $1^{st}$-ECU 5 (more specifically, the communication circuit 58) via the communication circuit 60.

In a case where it is determined that the gaseous fuel is designated as the fuel that is used in the engine 1 from the analysis result of the fuel designation signal that is input from the fuel-switching switch 4, the CPU 67 makes a request of generating a driving signal of the first and second shut-off valves for the first shut-off valve driving circuit 63 and the second shut-off valve driving circuit 64. Due to this, the first shut-off valve 41 and the second shut-off valve 42 enter an open state, and the gaseous fuel supply from the gaseous fuel tank 40 to the gaseous fuel injection valve 23 begins to start. In addition, the CPU 67 makes a request of generating a fuel injection valve driving signal for the fuel injection valve driving circuit 62 at the point in time at which the piston 11 reaches a position corresponding to a fuel injection time so as to perform injection of the gaseous fuel by the gaseous fuel injection valve 23.

Furthermore, when receiving a request of switching from the gaseous fuel to the liquid fuel (at the time of switching from the gaseous fuel supply by the gaseous fuel supply system 3 to the liquid fuel supply by the liquid fuel supply system 2) due to operation of the fuel-switching switch 4 by a user, as a characteristic function in this embodiment, the CPU 67 has a shut-off valve fault diagnosis function of performing a valve-shutting control of the first shut-off valve 41, of performing a valve-shutting control of the second shut-off valve 42 after a predetermined time has passed since the valve-shutting control of the first shut-off valve 41, and of performing fault diagnosis of the first shut-off valve 41 and the second shut-off valve 42 based on a variation tendency in a fuel pressure value after performing the valve-shutting control of the second shut-off valve 42. Hereinafter, the shut-off valve fault diagnosis function which the CPU 67 has will be described in detail.

First, a fault diagnosis principle of the first shut-off valve 41 and the second shut-off valve 42 in this embodiment is as follows. Specifically, when the valve-shutting control of the second shut-off valve 42 is performed after a predetermined time has passed since the valve-shutting control of the first shut-off valve 41, the variation tendency in the fuel pressure between the first shut-off valve 41 and the second shut-off valve 42 after performing the valve-shutting control of the second shut-off valve 42 becomes different in correspondence with a fault state of the first shut-off valve 41 and the second shut-off valve 42. Specifically, the fault diagnosis of the first shut-off valve 41 and the second shut-off valve 42 may be performed by confirming the variation tendency in the fuel pressure after performing the valve-shutting control of the second shut-off valve 42.

Figure 4:
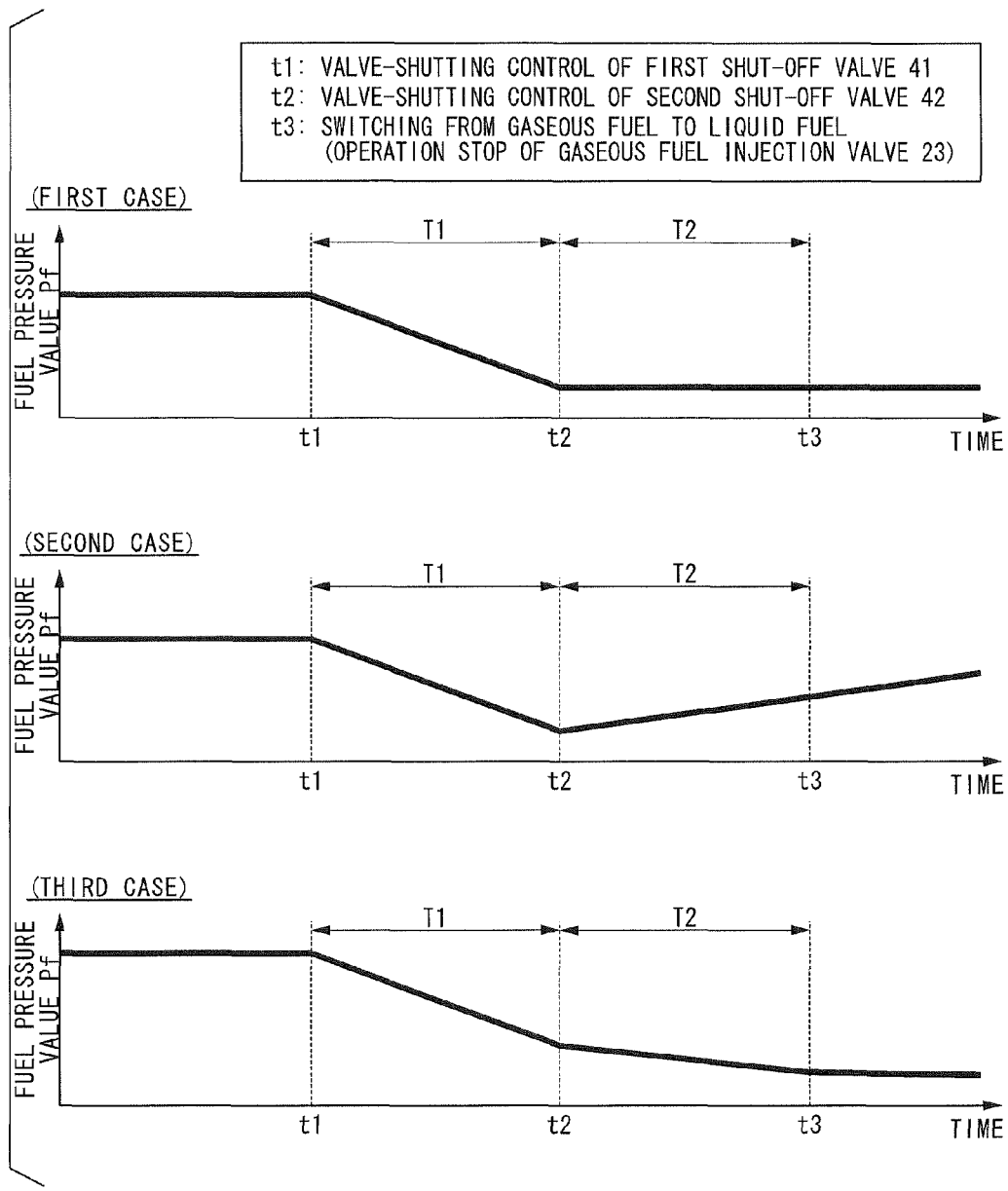
FIG. 4 is a diagram illustrating a variation of a fuel pressure value Pf with the passage of time, which is assumed with respect to fault cases of a first shut-off valve 41 and a second shut-off valve 42.

FIG. 4 illustrates a variation of a fuel pressure value Pf with the passage of time, which is assumed with respect to fault cases of a first shut-off valve 41 and a second shut-off valve 42, the fault cases including a case (first case) in which both of the first shut-off valve 41 and the second shut-off valve are normal, a case (second case) in which fuel leakage abnormality occurs in the first shut-off valve 41, and a case (third case) in which fuel leakage abnormality occurs in the second shut-off valve 42.

As shown in FIG. 4, in the first case, when the valve-shutting control of the first shut-off valve 41 is performed, fuel supply from the gaseous fuel tank 40 to the first shut-off valve 41 is blocked, but since the gaseous fuel downstream of the second shut-off valve 42 is consumed by the gaseous fuel injection valve 23, the fuel pressure value Pf decreases. In addition, when the valve-shutting control of the second shut-off valve 42 is performed after a predetermined time T1 has passed, since the gaseous fuel does not flow to the downstream of the second shut-off valve 42, the fuel pressure value Pf becomes stable to a valve after the predetermined time T1 has passed.

In addition, in the second case, even when the valve-shutting control of the first shut-off valve 41 is performed, the gaseous fuel is supplied to the downstream of the first shut-off valve 41 due to the fuel leakage, but since the gaseous fuel downstream of the second shut-off valve 42 is consumed by the gaseous fuel injection valve 23, the fuel pressure value Pf decreases once. On the other hand, when the valve-shutting control of the second shut-off valve 42 is performed after the predetermined time T1 has passed, since the gaseous fuel does not flow to the downstream of the second shut-off valve 42, the fuel pressure value Pf increases. That is, in a case where the variation tendency in the fuel pressure value Pf after performing the valve-shutting control of the second shut-off valve 42 is in an upward tendency, it may be determined that the first shut-off valve 41 is in a fault state.

In addition, in the third case, when the valve-shutting control of the first shut-off valve 41 is performed, the fuel supply from the gaseous fuel tank 40 to the downstream of the first shut-off valve 41 is blocked, but since the gaseous fuel downstream of the second shut-off valve 42 is consumed by the gaseous fuel injection valve 23, the fuel pressure value Pf decreases. On the other hand, when the valve-shutting control of the second shut-off valve 42 is performed after the predetermined time T1 has passed, the gaseous fuel flows to the downstream of the second shut-off valve 42 due to fuel leakage, and since this leaked fuel is consumed by the gaseous fuel injection valve 23, the fuel pressure value Pf decreases. That is, in a case where the variation tendency in the fuel pressure value Pf after performing the valve-shutting control of the second shut-off valve 42 is in a downward tendency, it may be determined that the second shut-off valve 42 is in a fault state.

Hereinafter, a description will be made with respect to a shut-off valve fault diagnosis process that is performed by the CPU 67 based on the fault diagnosis principle of the first shut-off valve 41 and the second shut-off valve 42 in this embodiment as described above so as to realize the shut-off valve fault diagnosis function with reference to a flowchart in FIG. 5.

Figure 5:
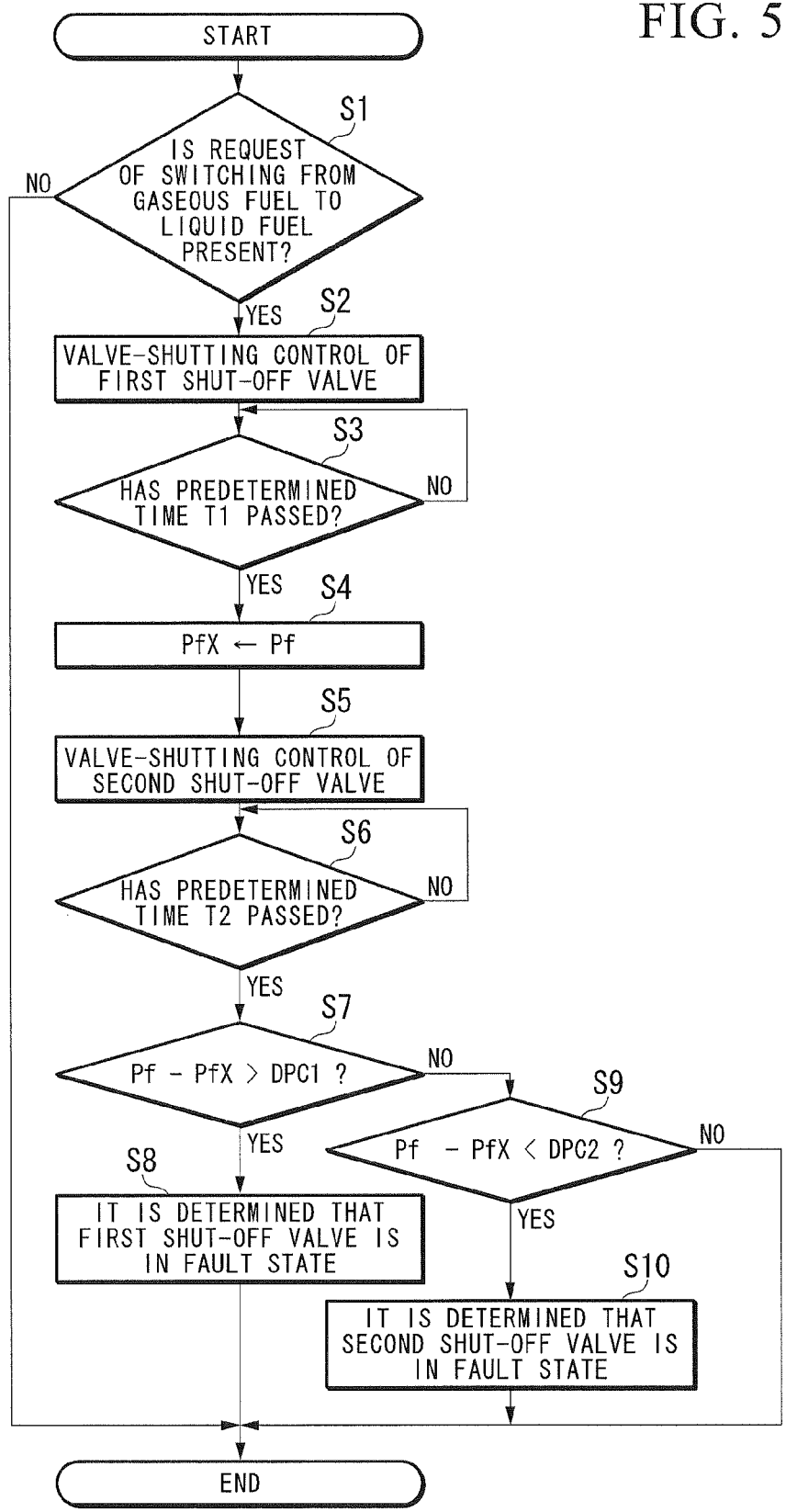
FIG. 5 is a flowchart illustrating a shut-off valve fault diagnosis process that is performed by a CPU 67 so as to realize a shut-off valve fault diagnosis function.

As shown in FIG. 5, the CPU 67 determines whether or not a request of switching from the gaseous fuel to the liquid fuel due to operation of the fuel-switching switch 4 by a user is received during operation control of the engine 1 by the gaseous fuel (step S1). Here, in the case of "No", the CPU 67 terminates the shut-off valve fault diagnosis process (continues the operation control of the engine 1 by the gaseous fuel).

On the other hand, in the case of "Yes" in step S1, that is, when the request of switching from the gaseous fuel to the liquid fuel is received, the CPU 67 performs the valve-shutting control of the first shut-off valve 41 through the first shut-off valve driving circuit 63 (step S2). In addition, the CPU 67 determines whether or not the predetermined time T1 (refer to FIG. 4) has passed after performing the valve-shutting control of the first shut-off valve 41 (step S3). Here, in the case of "Yes", a fuel pressure value Pf that may be obtained from the A/D converter 61 after the predetermined time T1 has passed is set as an immediately preceding fuel pressure value PfX (step S4).

In addition, the CPU 67 performs the valve-shutting control of the second shut-off valve 42 through the second shut-off valve driving circuit 64 (step S5). In addition, the CPU 67 determines whether or not a predetermined time T2 (refer to FIG. 4) has passed (step S6). In the case of "Yes" in step S6, the CPU 67 subtracts the immediately precedent fuel pressure value PfX from a fuel pressure value Pf that may be obtained from the A/D converter 61 after the predetermined time T2 has passed, and determines whether or not the subtraction result is larger than a first threshold value DPC1 (step S7). Here, a solid difference due to manufacturing or deterioration with the passage of time is present in the fuel pressure sensor 44, such that an error in a detection value with respect to an actual pressure variation occurs. Therefore, the first threshold value DPC1 is set so that correct determination may be performed even when the maximum error in the detection value of the pressure is anticipated.

In the case of "Yes" in step S7, that is, in a case where the variation tendency in the fuel pressure value Pf after performing the valve-shutting control of the second shut-off valve 42 is in an upward tendency (the second case in FIG. 4), the CPU 67 determines that the first shut-off valve 41 is in a fault state and terminates the shut-off valve fault diagnosis process (step S8). At this time, the CPU 67 stops operation of the gaseous fuel injection valve 23 after terminating the shut-off valve fault diagnosis process and switches to operation control of the engine 1 by the liquid fuel (refer to FIG. 4).

On the other hand, in the case of "No" in step S7, the CPU 67 subtracts the immediately precedent fuel pressure value PfX from a fuel pressure value Pf that may be obtained from the A/D converter 61 after the predetermined time T2 has passed, and determines whether or not the subtraction result is smaller than a second threshold value DPC2 (step S9). Here, a solid difference due to manufacturing or deterioration with the passage of time is present in the fuel pressure sensor 44, such that an error in a detection value with respect to an actual pressure variation occurs. Therefore, the second threshold value DPC2 is set so that correct determination may be performed even when the maximum error in the detection value of the pressure is anticipated. In the case of "Yes" in step S9, that is, in a case where the variation tendency in the fuel pressure value Pf after performing the valve-shutting control of the second shut-off valve 42 is in a downward tendency (the third case in FIG. 4), the CPU 67 determines that the second shut-off valve 42 is in a fault state and terminates the shut-off valve fault diagnosis process (step S10). At this time, the CPU 67 stops operation of the gaseous fuel injection valve 23 after terminating the shut-off valve fault diagnosis process and switches to operation control of the engine 1 by the liquid fuel (refer to FIG. 4).

In addition, in the case of "No" in step S9 (the first case shown in FIG. 4), the CPU 67 determines that both of the first shut-off valve 41 and the second shut-off valve 42 are normal and terminates the shut-off valve fault diagnosis process. At this time, the CPU 67 stops operation of the gaseous fuel injection valve 23 after terminating the shut-off valve fault diagnosis process and switches to operation control of the engine 1 by the liquid fuel (refer to FIG. 4).

As described above, according to this embodiment, when performing the fault diagnosis of the first shut-off valve 41 and the second shut-off valve 42, since it is sufficient for the fuel pressure sensor 44 (pressure sensor) to be one in number, and the fault diagnosis of the first shut-off valve 41 and the second shut-off valve 42 may be performed simultaneously according to the flowchart in FIG. 5, the fault diagnosis of the first shut-off valve 41 and the second shut-off valve 42 may be realized with a simple configuration in terms of hardware and software.

In addition, the present invention is not limited to the above-described embodiment, and the following modifications may be made.

(1) In the embodiment, a description was made with respect to a case in which the fault diagnosis of the first shut-off valve 41 and the second shut-off valve 42 is performed when switching from the gaseous fuel supply by the gaseous fuel supply system 3 to the liquid fuel supply by the liquid fuel supply system 2 as an example. However, the present invention is not limited thereto, and the fault diagnosis may be performed when the operation of the engine 1 is stopped. The shut-off valve opening and shutting operation during operation of the engine 1 may lead to a variation in the fuel pressure, and thus there is a concern in that driveability and emission may be deteriorated due to deviation in a fuel injection amount. However, as described above, when the fault diagnosis is performed when the operation of the engine 1 is stopped, it is possible to avoid such a problem.

In addition, in the case of using a shut-off valve of a kick pilot structure, which is provided with a pilot valve that is opened in advance during power supply and a main valve that is opened due to a decrease in differential pressure between the upstream and downstream after the pilot valve is opened, for example, when the differential pressure between upstream and downstream of the shut-off valve occurs during the fault diagnosis, for example, at the time of starting-up an engine, there is a concern in that the main valve may not be opened when the fuel consumption amount by the gaseous fuel injection valve 23 exceeds a fuel supply amount from the pilot valve. However, the fault diagnosis is performed while the operation of the engine 1 is stopped, and thus even the main valve is not opened, there is no problem in the operation of the engine 1.

In addition, when the fault diagnosis of the first shut-off valve 41 and the second shut-off valve 42 is performed while gaseous fuel supply by the gaseous fuel supply system 3 is switched to liquid fuel supply by the liquid fuel supply system 2, the same effect as the case in which the fault diagnosis is performed when the operation of the engine 1 is stopped may be obtained. In addition, since the gaseous fuel injection valve 23 is in an operation state and the gaseous fuel is supplied to the engine 1 during the fault diagnosis, when the fault diagnosis is performed while the operation of the engine 1 is stopped, the gaseous fuel becomes useless. However, the fault diagnosis is performed when the gaseous fuel supply is switched to the liquid fuel supply, and thus this uselessness may be avoided.

On the other hand, in a case where there is no concern about deterioration of the driveability and emission, or in a case where the shut-off valve having the kick pilot structure is not used, the fault diagnosis of the first shut-off valve 41 and the second shut-off valve 42 may be performed by executing the processes in steps S2 to S10 in FIG. 5 during operation of the engine 1.

(2) In the above-described embodiment, an exemplification was made with respect to a case in which it is determined whether or not the variation tendency in the fuel pressure value Pf after performing the valve-shutting control of the second shut-off valve 42 is in the upward tendency by subtracting the immediately precedent fuel pressure value PfX from a fuel pressure value Pf that may be obtained from the A/D converter 61 after the predetermined time T2 has passed, and by determining whether or not the subtraction result is larger than the first threshold value DPC 1. However, a method of determining whether or not the variation tendency in the fuel pressure value Pf is in the upward tendency is not limited thereto. For example, magnitude comparison of both values (Pf and PfX) is performed, and in a case where the immediately preceding fuel pressure value PfX is smaller than Pf, it may be determined that the tendency is in the upward tendency.

(3) In the above-described embodiment, an exemplification was made with respect to a case in which it is determined whether or not the variation tendency in the fuel pressure value Pf after performing the valve-shutting control of the second shut-off valve 42 is in the downward tendency by subtracting the immediately precedent fuel pressure value PfX from a fuel pressure value Pf that may be obtained from the A/D converter 61 after the predetermined time T2 has passed, and by determining whether or not the subtraction result is smaller than the second threshold value DPC2. However, a method of determining whether or not the variation tendency in the fuel pressure value Pf is in the downward tendency is not limited thereto. For example, magnitude comparison of both values (Pf and PfX) is performed, and in a case where the immediately preceding fuel pressure value PfX is larger than Pf, it may be determined that the tendency is in the downward tendency.

(4) In the above-described embodiment, the bi-fuel engine system A, which includes the $1^{st}$-ECU 5 that carries out an operation control by the liquid fuel and the $2^{nd}$-ECU 6 that carries out fault diagnosis of the first shut-off valve 41 and the second shut-off valve 42 in addition to an operation control by the gaseous fuel, separately, is exemplified, but a configuration in which the functions of the two ECUs are integrated in one ECU may be adopted.

(5) In the above-described embodiment, a description was made with respect to the bi-fuel engine system A as the fuel supply system relating to the present invention as an example. However, the present invention is not limited thereto, and even in a mono fuel engine system that supplies only the gaseous fuel to a single engine, the present invention is applicable to shut-off valve fault diagnosis as long as the mono fuel engine system is provided with two shut-off valves corresponding to the first shut-off valve 41 and the second shut-off valve 42.

INDUSTRIAL APPLICABILITY

According to the shut-off valve fault diagnosis device and the fuel supply system of the present invention, it is possible to realize fault diagnosis of a first shut-off valve that is disposed immediately after a gaseous fuel tank and a second shut-off valve that is disposed immediately before a regulator in a gaseous fuel supply system with a simple configuration in terms of software and hardware.

REFERENCE SIGNS LIST

A: Bi-fuel engine system
1: Engine
2: Liquid fuel supply system
3: Gaseous fuel supply system
4: Fuel-switching switch 5: 1$^{st}$-ECU (Electronic Control Unit)
6: 2$^{nd}$-ECU (shut-off valve fault diagnosis device)
23: Gaseous fuel injection valve
40: Gaseous fuel tank
41: First shut-off valve
42: Second shut-off valve
43: Regulator
44: Fuel pressure sensor (pressure sensor)
67: CPU (diagnosis processing unit)

The invention claimed is:

1. A shut-off valve fault diagnosis device that performs fault diagnosis of a first shut-off valve that is disposed immediately after a gaseous fuel tank and a second shut-off valve that is disposed immediately before a regulator in a gaseous fuel supply system, the shut-off valve fault diagnosis device comprising:
 a diagnosis processing unit that performs a valve-shutting control of the first shut-off valve, performs a valve-shutting control of the second shut-off valve after a predetermined time has passed since the valve-shutting control of the first shut-off valve, and performs fault diagnosis of the first shut-off valve and the second shut-off valve based on a variation tendency in a fuel pressure between the first shut-off valve and the second shut-off valve after performing the valve-shutting control of the second shut-off valve.

2. The shut-off valve fault diagnosis device according to claim 1,
 wherein in a case where the variation tendency in the fuel pressure after performing the valve-shutting control of the second shut-off valve is in an upward tendency, the diagnosis processing unit determines that the first shut-off valve is in a fault state.

3. The shut-off valve fault diagnosis device according to claim 1,
 wherein in a case where the variation tendency in the fuel pressure after performing the valve-shutting control of the second shut-off valve is in a downward tendency, the diagnosis processing unit determines that the second shut-off valve is in a fault state.

4. The shut-off valve fault diagnosis device according to claim 1,
 wherein the diagnosis processing unit performs the fault diagnosis of the first shut-off valve and the second shut-off valve when an engine operation is stopped.

5. The shut-off valve fault diagnosis device according to claim 1,
 wherein the diagnosis processing unit performs the fault diagnosis of the first shut-off valve and the second shut-off valve when gaseous fuel supply by the gaseous fuel supply system is switched to liquid fuel supply by a liquid fuel supply system.

6. A fuel supply system that is provided with a first shut-off valve that is disposed immediately after a gaseous fuel tank and a second shut-off valve that is disposed immediately before a regulator in a gaseous fuel supply system, the fuel supply system comprising:
 a pressure sensor that detects a fuel pressure between the first shut-off valve and the second shut-off valve; and
 a shut-off valve fault diagnosis device that performs a valve-shutting control of the first shut-off valve, performs a valve-shutting control of the second shut-off valve after a predetermined time has passed since the valve-shutting control of the first shut-off valve, and performs fault diagnosis of the first shut-off valve and the second shut-off valve based on a variation tendency in the fuel pressure after performing the valve-shutting control of the second shut-off valve.

7. The fuel supply system according to claim 6,
 wherein in a case where the variation tendency in the fuel pressure after performing the valve-shutting control of the second shut-off valve is in an upward tendency, the shut-off valve fault diagnosis device determines that the first shut-off valve is in a fault state.

8. The fuel supply system according to claim 6,
 wherein in a case where the variation tendency in the fuel pressure after performing the valve-shutting control of the second shut-off valve is in a downward tendency, the shut-off valve fault diagnosis device determines that the second shut-off valve is in a fault state.

9. The fuel supply system according to claim 6,
 wherein the shut-off valve fault diagnosis device performs the fault diagnosis of the first shut-off valve and the second shut-off valve when an engine operation is stopped.

10. The fuel supply system according to claim 6, further comprising:
 a liquid fuel supply system in addition to the gaseous fuel supply system,
 wherein the shut-off valve fault diagnosis device performs the fault diagnosis of the first shut-off valve and the second shut-off valve when gaseous fuel supply by the gaseous fuel supply system is switched to liquid fuel supply by the liquid fuel supply system.

* * * * *